Feb. 14, 1961  R. SCHULTZ  2,971,600
EXTENSIBLE AND RETRACTABLE STRUCTURE
Filed Feb. 16, 1959  2 Sheets-Sheet 1

INVENTOR.
RALPH SCHULTZ
BY
Whittemore, Hulbert & Belknap
ATTORNEYS

Feb. 14, 1961 R. SCHULTZ 2,971,600
EXTENSIBLE AND RETRACTABLE STRUCTURE
Filed Feb. 16, 1959 2 Sheets-Sheet 2
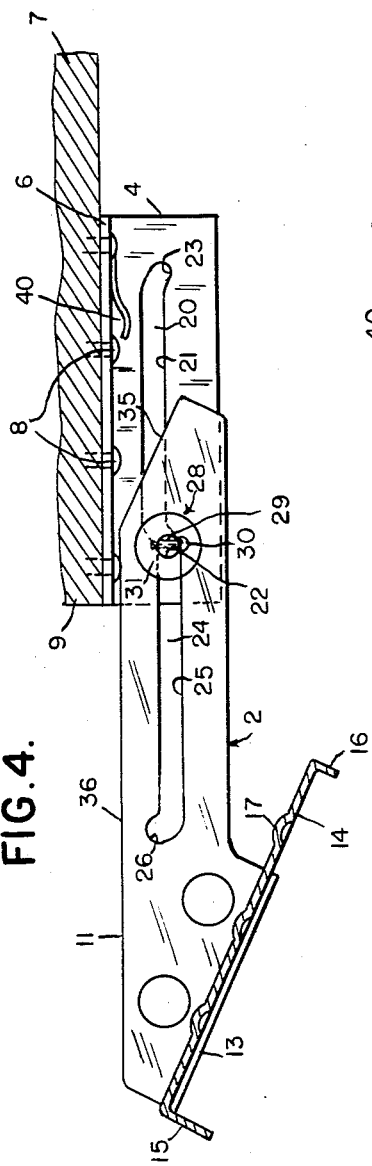
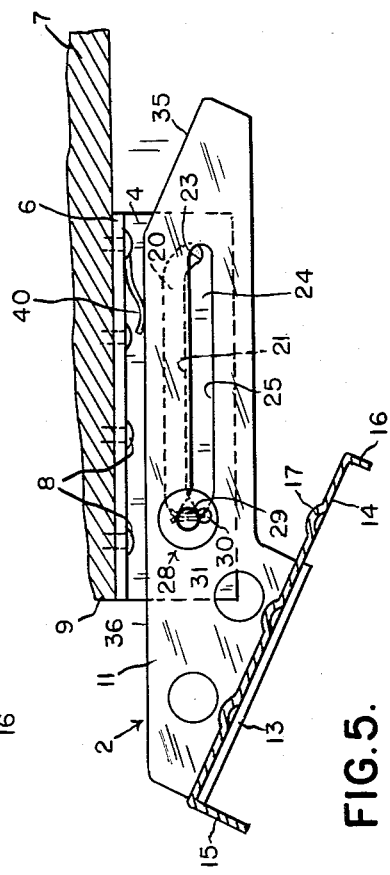
INVENTOR.
RALPH SCHULTZ
BY
ATTORNEYS

United States Patent Office 2,971,600
Patented Feb. 14, 1961

2,971,600

EXTENSIBLE AND RETRACTABLE STRUCTURE

Ralph Schultz, Whittier, Calif., assignor to Kelsey-Hayes Company, Detroit, Mich., a corporation of Delaware Filed Feb. 16, 1959, Ser. No. 793,324

9 Claims. (Cl. 182—88)

This invention relates to extensible and retractable structure and refers more particularly to extensible and retractable trailer step structure.

The invention has for one of its objects to provide extensible and retractable structure which is compact and has minimum overall dimensions in both the extended and retracted positions.

The invention has for another of its objects to provide a step structure for a trailer or the like which is extensible to an operative position projecting beyond the trailer frame and retractable to an inoperative position fully withdrawn beneath the trailer frame.

Other objects and features of the invention will become apparent as the description proceeds, especially when taken in conjunction with the accompanying drawings, illustrating a preferred embodiment of the invention, wherein:

Figs. 4 and 5 are similar to Fig. 2 showing the step in different positions.

Figure 3:
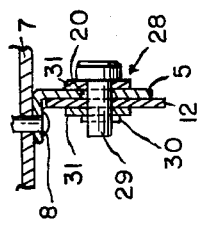
Fig. 3 is a view showing a portion of Fig. 2 in section.

While the step structure is shown associated with a trailer, it has many other applications and may be used wherever an extensible and retractable step is needed.

Moreover, with only slight modifications the extensible and retractable structure can be adapted for other uses such as a mounting for a spare tire on a truck or trailer, for example.

Referring now more particularly to the drawings, the step structure is indicated generally at 1 and comprises a step 2 and a step support 3. The step support comprises a pair of laterally spaced rails 4 and 5 which are in the form of parallel plates having inturned flanges 6 along their upper edges secured to the underside of the trailer frame 7 by fasteners 8. The outer edges of the rails 4 and 5 are flush with the side 9 of the trailer and the rails extend inwardly therefrom. The step structure is provided to facilitate entering and leaving the trailer through the opening or doorway 10 in the side 9 of the trailer directly above the step structure.

The step 2 comprises a pair of laterally spaced brackets 11 and 12 which are in the form of parallel plates spaced apart a distance substantially equal to but slightly less than the spacing between the rails 4 and 5. The brackets are formed at the outer ends with inturned flanges 13 which serve to support the tread 14. The side edges of the tread are rigidly secured to the flanges 13, and the tread has the downturned outer and inner flanges 15 and 16 respectively. The tread is also formed to provide parallel upstanding beads or ribs 17 for traction.

The rails 4 and 5 are formed with identical guide slots 20 which are laterally opposed to each other. The slots 20 have the central elongated horizontal portions 21 and the downwardly offset ends 22 and 23. The brackets 11 and 12 have identical guide slots 24 which are laterally opposed and have the elongated straight portions 25 and the upturned offset portions 26 at the outer ends. All of the slots 20 and 24 are of the same width.

The step is slidably connected to the support 3 by the assemblies 28 for movement in the direction of length of rails 4 and 5. The assemblies 28 are alike and each slidably connects a bracket and rail with the bracket on the inner side of its associated rail and in a parallel plane. Each assembly 28 comprises a headed hinge pin 29 the shank of which has a diameter approximating the width of the slots and extends through the slot of the associated bracket and rail. Each hinge pin shank is slidable and rotatable in both the bracket and rail slots, and a cotter pin 30 through the shank cooperates with the head of the pin to prevent disengagement. Washers 31 are interposed between the hinge pin head and rail and between the cotter pin and bracket to facilitate sliding and swinging movement of the step. The hinge pins remain aligned at all times during the in and out movement of the step.

Figure 2:
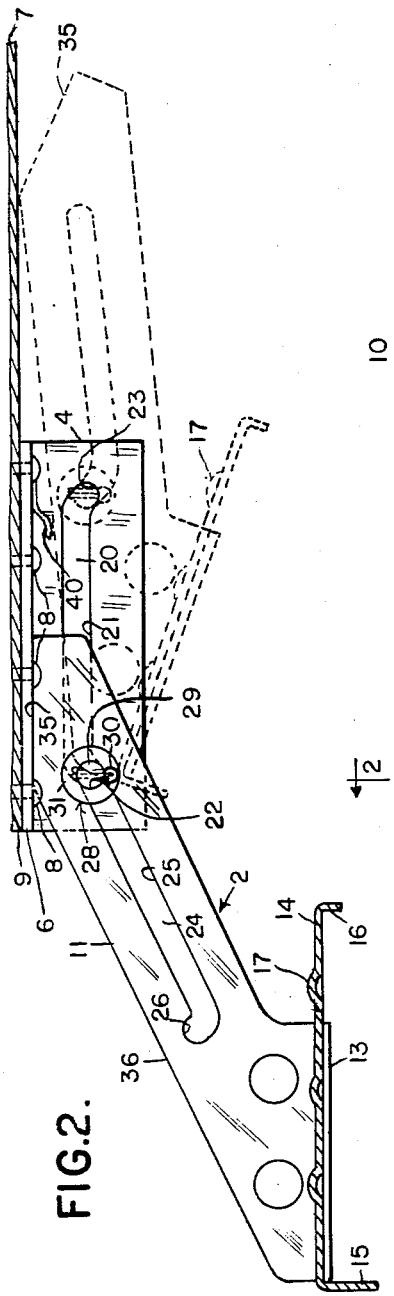
Fig. 2 is a sectional view taken on the line 2—2 of Fig. 1, showing the step extended in full lines and retracted in dotted lines.

Fig. 2 shows the step extended in full lines in which position the tread is horizontal and the upper beveled edge 35 at the inner end of each bracket engages the flange 6 of the associated rail to firmly support the step in the illustrated position of use. To retract the step, it is swung up from the solid line position shown in Fig. 2 to the position of Fig. 4 in which its straight upper edge 36 is horizontal and spaced closely beneath the flange 6 of the rails. In this position of the step, the portions 25 of its slots are horizontal and accordingly the step may be moved rearwardly relative to the aligned hinge pins engaged in the outer offsets 22 of the rail slots. The pins cannot move out of the rail slot offsets 22 because this would require a substantial upward movement of the step which is prevented by the flanges 6 overlying the edges 36 of the brackets. The flanges 6 serve as guides retaining the step in horizontal position during the inward movement from the Fig. 4 position.

When the step is retracted to the intermediate Fig. 5 position, its outer offsets 26 drop to engagement with the pins whereupon continued inward movement of the step will raise the pins out of the outer offsets of the rail slots. The pins will then move as a unit with the step during the remainder of the movement of the step to the dotted line position of Fig. 2. In this position, the pins drop into the rear or locking offsets 23 of the rail slots to hold the step in retracted position.

Figure 1:
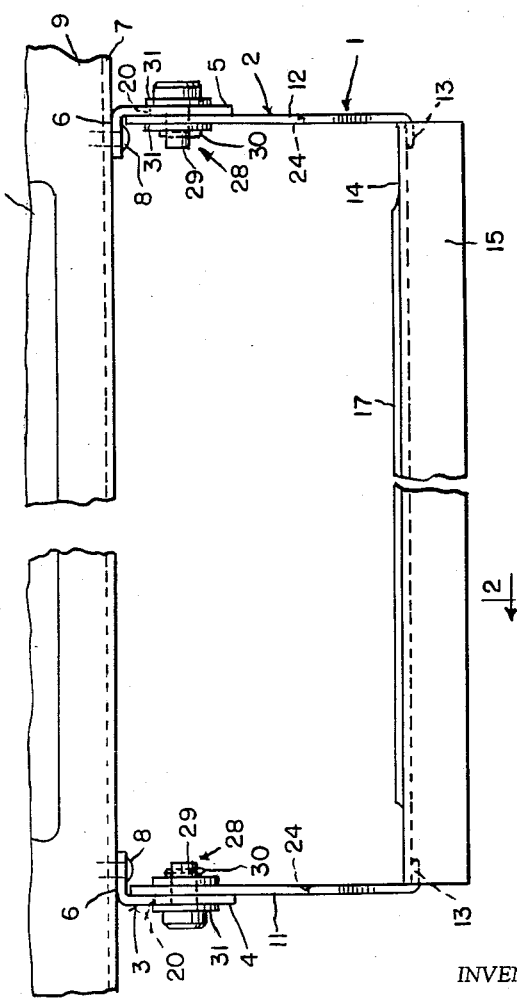
Fig. 1 is a fragmentary front elevation of step structure embodying my invention.

In the retracted position of the step, the weight of the tread is sufficient to cause the step to turn about the aligned axes of hinge pins 29 in a counterclockwise direction until the inner ends of the brackets engage the trailer frame as shown in Fig. 1. Normally the moment of force holding the brackets against the trailer frame is enough to prevent rattling. However flexible leaf springs 40 may be provided for engaging and bearing downwardly against the step brackets at the outer side of the hinge pins when the step is retracted to assist in holding the step from rattling. The springs 40 are secured to the rail flanges 6 and are relatively thin and flexible and turned up at the outer ends. The springs are cammed up and out of the way by the brackets 11 and 12 during movement of the step from the Fig. 4 to the Fig. 5 position.

Movement of the step from retracted to extended position involves the reverse of the procedure described above. The tread flange 15 may be grasped to pull the step outwardly from retracted position. The pins 29, in bracket slot offsets 26, are lifted out of rail slot offsets 23 and move outwardly as a unit with the step until they drop into the offsets 22 at the outer ends of the rail slots (Fig. 5). Continued outward pull on the step lifts it slightly and the step slides to the Fig. 4 position during which time the hinge pins are engaged in the straight portions 25 of the bracket slots. When the Fig. 4 position is reached, the step will swing to the position of use, shown in full lines in Fig. 1, in which the tread is horizontal. The flanges 6 of the rails, which closely overlie the brackets 11 and 12 in all but the extended position of the step, prevent the step from swinging down to the position of use until the fully extended position of Fig. 4 is reached.

When extended and in the position of use shown in full lines in Fig. 1, the step extends beyond the trailer frame, and when retracted it is fully withdrawn beneath the trailer frame.

What I claim as my invention is:

1. Structure of the character described comprising an extensible and retractable unit, support means including a fixed member, and means for supporting said unit on said support means for movement between extended and retracted positions including guides on said fixed member and unit elongated in the direction of movement of said unit and a connecting member slidably engaging said guides, said guides each having an offset portion at their corresponding ends to enable said unit to be moved from one of said positions to an intermediate position during which time the connecting member slides in one guide and engages the offset portion of the other guide and from said intermediate position to the other of said first-mentioned positions during which time said connecting member slides in the said other guide and engages the offset portion of said one guide, said connecting member being simultaneously engageable with the offset portions of both guides to determine said intermediate position.

2. Structure of the character described comprising an extensible and retractable unit, support means including a fixed member, and means for supporting said unit on said support means for out and in movement between extended and retracted positions including guide slots on said fixed member and unit elongated in the direction of movement of said unit and a hinge pin slidably engaging said guide slots, said guide slots each having an offset portion at their outer ends to enable said unit to be moved from said extended position to an intermediate position during which time said pin slides in the slot of said unit and engages the offset portion of the slot of said fixed member and from said intermediate position to said retracted position during which time said pin slides in the slot of said fixed member and engages the offset portion of the slot of said unit, said pin being simultaneously engageable with the offset portions of both slots to determine said intermediate position.

3. Structure of the character described comprising an extensible and retractable unit, support means including a fixed member, and means for supporting said unit on said support means for out and in movement between extended and retracted positions including guide slots on said fixed member and unit elongated in the direction of movement of said unit and a hinge pin slidably engaging said guide slots, said guide slots each having an offset portion at their outer ends to enable said unit to be moved from said extended position to an intermediate position during which time said pin slides in the slot of said unit and engages the offset portion of the slot of said fixed member and from said intermediate position to said retracted position during which time said pin slides in the slot of said fixed member and engages the offset portion of the slot of said unit, said portions of said slots being offset in opposite directions and said pin being simultaneously engageable with both offset portions to determine said intermediate position, said unit being swingable about the axis of said hinge pin to a position of use when extended, and stop means engageable with said unit to determine said position of use.

4. Step structure comprising a step having a tread, step support means including a fixed member, and means for supporting said step on said support means for out and in movement between extended and retracted positions including guide slots on said fixed member and step elongated in the direction of movement of said step and a hinge pin slidably engaging said guide slots, said guide slots each having an offset portion at their outer ends to enable said step to be moved from said extended position to an intermediate position during which time said pin slides in the slot of said step and engages the offset portion of the slot of said fixed member and from said intermediate position to said retracted position during which time said pin slides in the slot of said fixed member and engages the offset portion of the slot of said step, said portions of said slots being offset in opposite directions and said pin being simultaneously engageable with both offset portions to determine said intermediate position, said step being swingable about the axis of said hinge pin to a position of use when extended, stop means engageable with said step to determine said position of use, and means for holding said step in retracted position including an offset portion at the inner end of said slot of said fixed member engageable with said pin when the latter is simultaneously engaged in said step slot.

5. Step structure for a trailer or the like having a frame, said step structure comprising a step having a tread and a pair of laterally spaced brackets connected to said tread, step support means including a pair of laterally spaced rails fixed to said frame, and means for supporting said step on said support means for out and in movement between extended and retracted positions including a pair of laterally opposed parallel guide slots in said rails elongated horizontally in the direction of movement of said step and a pair of laterally opposed elongated parallel guide slots in said brackets, means for connecting said brackets to said rails respectively including aligned hinge pins slidably engaging the slots thereof, the corresponding end of each slot having an offset portion to enable said step to be moved from said extended position to an intermediate position during which time said pins slide in the slots of one pair and engage the offset portions of the slots of the other pair and from said intermediate position to said retracted position during which time said pins slide in the slots of said other pair and engage the offset portions of the slots of said one pair, said pins being simultaneously engageable with the offset portions of both of said rail and bracket slots to determine said intermediate position.

6. Step structure for a trailer or the like having a frame, said step structure comprising a step having a tread and a pair of laterally spaced brackets connected to said tread, step support means including a pair of laterally spaced rails fixed to said frame, and means for supporting said step on said support means for out and in movement between extended and retracted positions including laterally opposed parallel guide slots in said rails elongated horizontally in the direction of movement of said step and laterally opposed elongated parallel guide slots in said brackets, means for connecting said brackets to said rails respectively including aligned hinge pins slidably engaging the slots thereof, the outer end of each slot having an offset to enable said step to be moved from said extended position to an intermediate position during which time said pins slide in said bracket slots and engage the offset portions of said rail slots and from said intermediate position to said retracted position during which time said pins slide in said rail slots and engage the offset portions of said bracket slots, said portions of said rail slots being offset in one direction and said portions of said bracket slots being offset in the opposite direction and said pins being simultaneously engageable with the offset portions of both said bracket and rail slots to determine said intermediate position, said step being swingable about the aligned axes of said hinge pins to a position of use when extended, and stop means engageable with said brackets to determine said position of use.

7. Step structure for a trailer or the like having a frame, said step structure comprising a step having a tread and a pair of laterally spaced brackets connected to said tread, step support means including a pair of laterally spaced rails fixed to said frame, and means for supporting said step on said support means for out and in movement between extended and retracted positions including laterally opposed parallel guide slots in said rails elongated horizontally in the direction of movement of said step and laterally opposed elongated parallel guide slots in said brackets, means for connecting said brackets to said rails respectively including aligned hinge pins slidably engaging the slots thereof, the outer end of each rail slot having a downward offset portion and the outer end of each bracket slot having an upward offset portion to enable said step to be moved from said extended position to an intermediate position duing which time said pins slide in said bracket slots and engage the offset portions of said rail slots and from said intermediate position to said retracted position during which time said pins slide in said rail slots and engage the offset portions of said bracket slots, said pins being simultaneously engageable in the offset portions of both said rail and bracket slots to determine said intermediate position, said step being swingable downwardly about the aligned axes of said hinge pins to a position of use when extended, stop means engageable with said brackets to determine said position of use, and means preventing the aforesaid swinging of said step in other than its extended position and effective to hold said step substantially horizontal during its movement between extended and retracted positions.

8. Step structure for a trailer or the like having a frame, said step structure comprising a step having a tread and a pair of laterally spaced brackets connected to said tread, step support means including a pair of laterally spaced rails fixed to said frame, and means for supporting said step on said support means for out and in movement between extended and retracted positions including laterally opposed parallel guide slots in said rails elongated horizontally in the direction of movement of said step and laterally opposed elongated parallel guide slots in said brackets, means for connecting said brackets to said rails respectively including aligned hinge pins slidably engaging the slots thereof, the outer end of each rail slot having a downward offset portion and the outer end of each bracket slot having an upward offset portion to enable said step to be moved from said extended position to an intermediate position during which time said pins slide in said bracket slots and engage the offset portion of said rail slots and from said intermediate position to said retracted position during which time said pins slide in said rail slots and engage the offset portions of said bracket slots, said pins being simultaneously engageable in the offset portions of both said rail and bracket slots to determine said intermediate position, means for holding said step in retracted position including downward offsets at the inner ends of said rail slots engageable with said pins when the latter are simultaneously engaged in said bracket slot offsets, said step being swingable about the aligned axes of said hinge pins to a position of use when extended, and stop means engageable with said brackets to determine said position of use, said step in extended position projecting beyond said frame and in retracted position being fully withdrawn within the margin of said frame.

9. Step structure as in claim 8 in which said step holding means also includes a spring engageable with said step in its retracted position opposing movement therefrom.

References Cited in the file of this patent

UNITED STATES PATENTS

| | | |
|---|---|---|
| 415,661 | White | Nov. 19, 1889 |
| 2,153,945 | Thelander | Apr. 11, 1939 |
| 2,153,946 | Linstead et al. | Apr. 11, 1939 |
| 2,209,576 | McDonald | July 30, 1940 |
| 2,852,271 | McDonald | Sept. 16, 1958 |